(12) United States Patent
Shahbazi

(10) Patent No.: US 7,669,237 B2
(45) Date of Patent: Feb. 23, 2010

(54) ENTERPRISE-WIDE SECURITY SYSTEM FOR COMPUTER DEVICES

(75) Inventor: Majid Shahbazi, Oakton, VA (US)

(73) Assignee: Trust Digital, LLC, McLean, VA (US)

( * ) Notice: Subject to any disclaimer, the term of this patent is extended or adjusted under 35 U.S.C. 154(b) by 0 days.

(21) Appl. No.: 10/527,235

(22) PCT Filed: Aug. 27, 2003

(86) PCT No.: PCT/US03/26645

§ 371 (c)(1),
(2), (4) Date: Nov. 30, 2005

(87) PCT Pub. No.: WO2004/021114

PCT Pub. Date: Mar. 11, 2004

(65) Prior Publication Data

US 2006/0112427 A1     May 25, 2006

Related U.S. Application Data

(60) Provisional application No. 60/406,032, filed on Aug. 27, 2002.

(51) Int. Cl.
    *H04L 29/06*     (2006.01)
(52) U.S. Cl. .................................................. 726/22
(58) Field of Classification Search .............. 726/1–4, 726/11–14, 17, 22, 25, 26; 713/151, 152, 713/165, 167, 182; 709/223–225, 229; 707/1, 707/10
See application file for complete search history.

(56) References Cited

U.S. PATENT DOCUMENTS

| | | | |
|---|---|---|---|
| 6,317,868 B1 * | 11/2001 | Grimm et al. | 726/2 |
| 6,678,827 B1 * | 1/2004 | Rothermel et al. | 726/6 |
| 7,136,907 B1 * | 11/2006 | Nordstrom et al. | 709/220 |
| 2001/0041576 A1 | 11/2001 | Anson et al. | |
| 2002/0032853 A1 | 3/2002 | Preston et al. | |
| 2002/0068559 A1 * | 6/2002 | Sharma et al. | 455/423 |
| 2002/0098840 A1 * | 7/2002 | Hanson et al. | 455/435 |
| 2002/0120599 A1 * | 8/2002 | Knouse et al. | 707/1 |
| 2002/0184532 A1 * | 12/2002 | Hackenberger et al. | 713/201 |
| 2003/0130953 A1 | 7/2003 | Narasimhan et al. | |
| 2003/0140246 A1 | 7/2003 | Kammer et al. | |
| 2003/0162555 A1 | 8/2003 | Loveland | |
| 2003/0167405 A1 * | 9/2003 | Freund et al. | 709/223 |

(Continued)

FOREIGN PATENT DOCUMENTS

| WO | WO2005064498 | 7/2005 |
|---|---|---|
| WO | WO2005107144 | 11/2005 |

OTHER PUBLICATIONS

Smith, Randy F., "Tracking Logon and Logoff Activity in Windows 2000", Feb. 2001, Microsoft TechNet, http://www.microsoft.com/technet/prodtechnol/windows2000serv/maintain/monitor/logonoff.mspx.*

*Primary Examiner*—Gilberto Barron, Jr.
*Assistant Examiner*—Abdulhakim Nobahar
(74) *Attorney, Agent, or Firm*—Nixon Peabody, LLP; Stephen M. Hertzler

(57) ABSTRACT

A system and method for securing data in mobile devices includes a computing node and a plurality of mobile devices. A node security program executed in the computing node interfaces with a device security program executed at a mobile device. The computing node is responsible for managing the security based on a node security profile interpreted by a node security program executed in the computing node. A device discovery method and arrangement also detects and locates various information about the mobile devices based on a scan profile.

11 Claims, 9 Drawing Sheets

U.S. PATENT DOCUMENTS

| | | |
|---|---|---|
| 2003/0177389 A1* | 9/2003 | Albert et al. .............. 713/201 |
| 2004/0022258 A1 | 2/2004 | Tsukada et al. |
| 2004/0030705 A1 | 2/2004 | Bowman-Amuah |
| 2004/0083382 A1 | 4/2004 | Markham et al. |
| 2004/0123150 A1 | 6/2004 | Wright et al. |
| 2004/0128394 A1 | 7/2004 | Knauerhase et al. |
| 2004/0225524 A1 | 11/2004 | Narasimhan et al. |
| 2004/0268145 A1 | 12/2004 | Watkins et al. |
| 2005/0055578 A1 | 3/2005 | Wright et al. |
| 2005/0097199 A1 | 5/2005 | Woodard et al. |
| 2005/0135375 A1 | 6/2005 | Hurtta et al. |
| 2005/0255838 A1 | 11/2005 | Adams et al. |
| 2005/0257246 A1 | 11/2005 | Adams et al. |
| 2006/0005254 A1 | 1/2006 | Ross |
| 2006/0036730 A1 | 2/2006 | Graham et al. |
| 2006/0075472 A1 | 4/2006 | Sanda et al. |
| 2006/0089938 A1 | 4/2006 | Leonard et al. |
| 2006/0095953 A1 | 5/2006 | Frank |

* cited by examiner

```xml
<r_8F092CDD-DABB-452f-83E5-FC00849D74C7>
 <PolicyEditor>
  <IsCommonPolicy value="true" />
  <DeviceType value="Pocket PC" />
  <CreationStamp value="2003-08-26 17:34:46" />
  <UserName value="Pocket PC" />
  <hotSyncName value="Pocket PC" />
  <Version value="21" />
  <MagicValue value="1004695628" />
  <SerialNumber value="N-082603AUVP2082" />
  <AdminPassword value="[1]" />
  <SessionKey value="ad21a791bed695fc300f87cfcc566651Bd3dbc68" />
  <NewAdminPassword value="[1]" />
  <ChangePassword value="false" />
  <ForceGlobalPasswordChange value="false" />
  <ExpirationPeriod value="0" />
  <MinPasswordLength value="1" />
  <FolderName value="SecureFolder" />
  <CryptoMethod value="RC4" />
  <StorageSize value="65536" />
  <UserCanSeeSettings value="true" />
  <RestrictionStartTime value="0" />
  <RestrictionEndTime value="0" />
  <PasswordRestriction value="33686018" />
  <GlobalPasswordRestriction value="2" />
  <LocalPasswordRestriction value="2" />
  <BackdoorPasswordRestriction value="2" />
  <WipePasswordRestriction value="2" />
  <WorkingDays value="0" />
  <Company value="Trust Digital" />
  <Address value="" />
```

FIG. 3

ENTERPRISE-WIDE SECURITY SYSTEM FOR COMPUTER DEVICES

TECHNICAL FIELD

The present invention relates in general to the field of data security and more particularly to providing data security to mobile devices.

BACKGROUND

Recent advances in hardware and communication technologies have brought about the proliferation of powerful mobile devices ranging from notebook computers to much smaller personal digital assistants (PDAs) that operate over wired and wireless networks. These mobile devices (also known as handheld devices) operate on various platforms, such as palm computing platform, Windows CE, etc. Other types of mobile devices include paging and messaging devices, laptop computers, data-capable smart phones, etc. These devices can provide users with network access connectivity, which allows users to be quickly notified of changing events, and provide them with the resources necessary to respond even when in transit. In this way, users can be given the power to access mission critical information in quick and reliable manner. For example, data generated by client applications running on a wide variety of mobile devices may be transported over networks having various access protocols and wired and wireless links. One such protocol is Transmission Control Protocol/Internet Protocol (TCP/IP), which is designed to connect computer systems that use different operating systems and network technologies. Many popular network applications have been built directly on top of the TCP over the past decade, maling TCP/IP a de-facto network access protocol standard.

Many personal computer users use Personal Information Management (PN) applications such as an address book, a daily organizer, and a To-Do list application-on their personal computers and mobile devices. The data for these PIMS are stored in corresponding databases at the personal computers and mobile devices. Often, data in these databases must be synchronized in order to maintain data uniformity. The synchronization of data between devices of this type is known. For example, U.S. Pat. No. 6,006,274 describes a "Method and Apparatus Using a Pass Through Personal Computer Connected to Both a Local Communication Link and a Computer Network for Identifying and Synchronizing a Preferred Computer with a Portable Computer". Also, U.S. Pat. Nos. 6,000,000 and 5,884,323 both describe an "Extendible Method and Apparatus for Synchronizing Multiple Files on Two Different Computer Systems." Generally, the synchronization process is activated either by detecting a mobile device on a cradle or by manual press of a button. The synchronization process proceeds to synchronize data for several different applications that run on the mobile devices with data for corresponding application on other computers.

As society continues to adopt handheld devices as a standard computing platform and applications become more powerful with the standardization of wired and wireless computing, security threats to data stored in these types of mobile devices have become a serious concern and have created a heightened awareness and increased need for security. In fact, the U.S. Air Force Research Laboratory (AFRL), which develops some of the government's most advanced technologies, is crafting a policy to deal with security risks for data stored in mobile devices.

Various types of security software incorporating different data security encryption standards have been used in the past for securing network, desktop, laptop and PDA environments. On such suit of software is called Trusted Mobility Suite™ offered by Trust Digital™, which is used to set access control, encryption, and other parameters and push them to such mobile devices as Palm Pilot™, Pocket PC™, Blackberry™ or Symbian OS devices to protect against fraud and theft, sabotage, malicious hacking and other adverse exposure caused by data compromise. For example, at a network level, PDASecure™ Virtual Private Network provides secure communication among mobile devices or between mobile devices and routers and servers. Mobile DesktopSecure™ is a security and encryption software designed to protect files, data, applications, databases, directories, or an entire hard drive. It is also used to push security profiles containing defined security policies from a server to protect laptops and desktops within a network. Generally, Trusted Mobility Suite™ implements security using a graphical user interface (GUT) that allows administrators and users to secure all or selected applications. In this way, the users and administrators can selectively secure application(s) from unwanted and unauthorized access.

Trusted Mobility Suite™ manages data security for mobile devices at different levels. At a higher server level Trusted Mobility Server™ deploys, manages, and secures networks containing mobile devices using a centralized management solution. A policy-profile editor is used to set security parameters for groups of users based on defined security policies. At a lower device level PDASecure™ encrypts the data on the mobile device itself and offers-security management for those devices through the Trust Mobility Server. Once installed on a mobile device, PDASecure™ provides for universal integration with all available mobile devices on the network, without the requirement for moving data into separate, secured applications. Also, Trusted Mobility Software Development Kit™ allows software developers to incorporate Trust Digital's Mobility Framework, comprising security, encryption, and centralized rule-based management technologies into their products, for mobile/PDA users.

Also, U.S. Pat. No. 6,158,010 discloses a system and method for maintaining security in a distributed computing environment that comprises a policy manager located on a server for managing and distributing a security policy, and an application guard located on a client for managing access to securable components as specified by the security policy. A global policy specifies access privileges of the user to securable components. The policy manager may then preferably distribute a local client policy based on the global policy to the client. An application guard located on the client then manages access to the securable components as specified by the local policy.

Implementation of comprehensive security policies in networks that supports large number of mobile devices has become an important issue for many enterprises, particularly in view of complexities associated with supporting various hardware and software platforms in terms of network architectures, protocols, device types, etc. Add to this complexity, the various situations under which data security may be breached, either on the network side or on the device side. Additionally, due to availability of limited memory and processing resources, creating security programs for mobile devices is much more complicated than that of larger computers. Therefore, there exists a need for an efficient and flexible system and method for securing data in mobile devices used under varying operating environments.

BRIEF DESCRIPTION OF DRAWINGS

FIG. 3 is an exemplary security profile for setting security parameters for the computing node and device.

SUMMARY OF THE INVENTION

Figure 1:
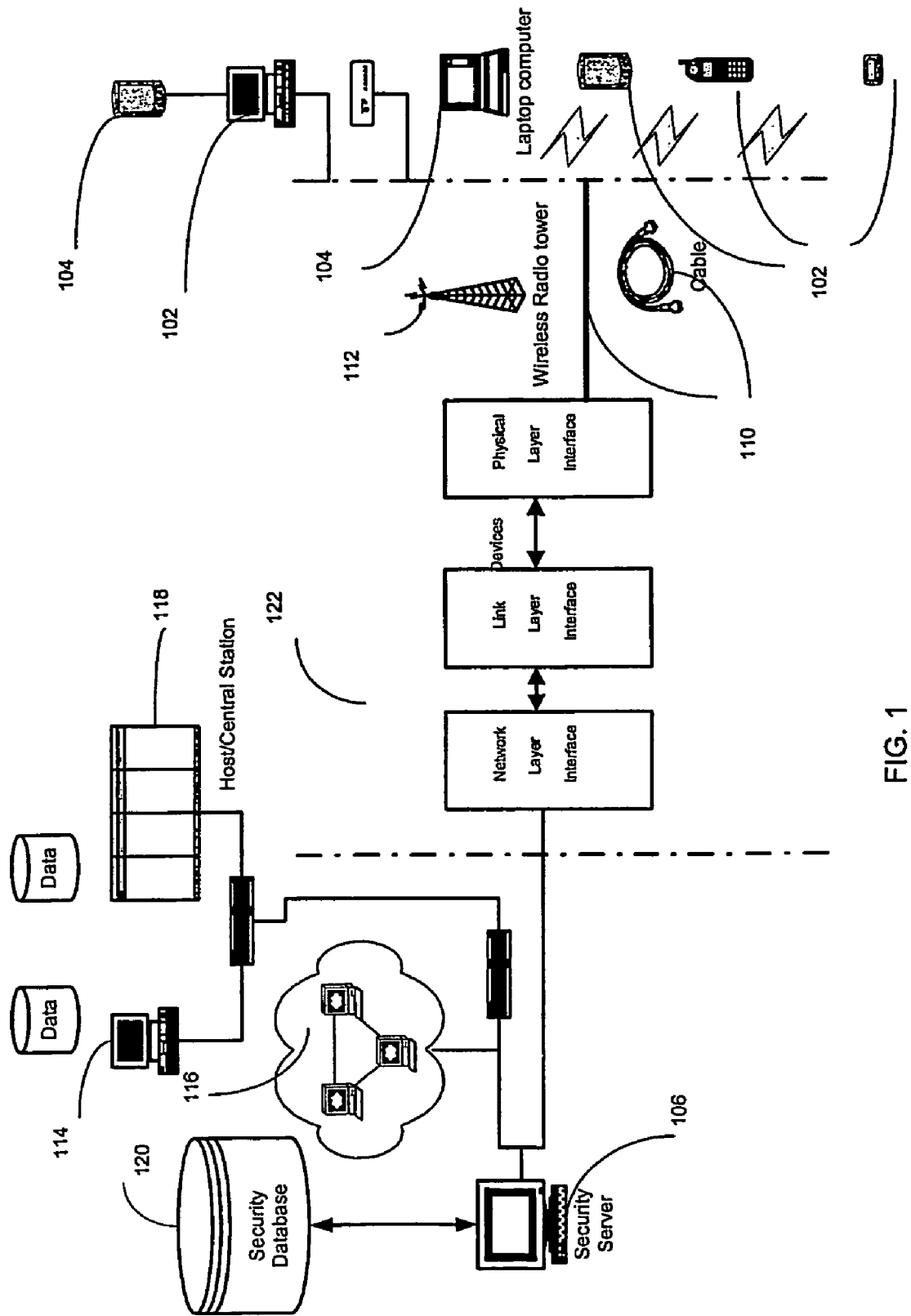
FIG. 1 is a diagram of a system that implements security control and management of the present invention.

Briefly, according to one aspect, the present invention relates to securing a computer system that includes one or more mobile devices and a computing node. A node security program executed in the computing node interprets a node security profile. The node security profile has a format, including text, .ini., binary, XML, etc. that allows for interpretive processing by the node security program to determine one or more security parameters. The present invention then manages the security processes between the computing node and one or more mobile devices based on the security parameters as determined by interpreting the node security profile. The security processes can include any one of securing a storage device, data, file, program and application in either one of the computing node and the one or more mobile devices or other resources such as removable storage media that can be connected to the computing node or mobile devices. In effect, the computing node, based on the security parameters specified by the node security profile, protects both the computing node and the mobile devices (or other resources) from unauthorized incoming and outgoing data processes. These processes are secured by authorizing, denying, preventing, disabling, locking and password protecting data synchronization, data transfer, data query, data collection, network access, program execution, and data manipulation, including unauthorized deletions and additions.

According to some of the more detailed features of the present invention, security parameters can have attributes relating to a data, file, security profile, application and program. Such attributes can be expressed in terms of size and type. The security parameter can relate to temporal or position attributes. Temporal attributes include date, minute, hour, week, month and year. Position attributes include position determined by various positioning techniques, e.g. GPS, zip code, address, region, and location. The security parameters can also be expressed in terms of a serial number, a model number, a software license number, mobile device type, computing node type, connection type and network type, wither wired or wireless network. The connection types supported by the invention include direct connection and an off-line connection between the computing node and the one or more mobile devices or resources. The security parameter can also be expressed in terms physical address, network resource ID, IP address, domain name, client station ID, mobile device ID or server ID. The security parameters can also relate to handling guest and unknown devices as well as managing a VPN.

According yet other more detailed features of the present invention, a device security profile, which sets device security parameters, can be transferred to the mobile devices by accessing a server station, central station or computing node. The device security profile is interpreted by a device security program running on the mobile device to determine the security parameters that control the mobile device. The device security profile can also be transferred based on temporal or position attributes and be periodically updated as necessary. The device security profile can also be transferred as a part of a data synchronization process between the computing node and a mobile device. The present invention can lock unauthorized or under some circumstances even authorized mobile devices attempting to access the system, for example by transmitting a security software that locks the intruding device. The node security profile and device security profiles can be transmitted using push or pull technology or an over the air protocol.

According to another aspect of the present invention a discovery method for mobile devices discovers information regarding the mobile devices by running a discovery program either remotely or locally. The discovery method of the invention includes detecting mobile device types, connection profiles, and location of mobile devices, among other things. The mobile device information are detected based on a registry resource, a file resource, a process resource, a network management parameter, a data format, a packet format, a synchronization log entry, a directory structure or a database entry.

According to other more detailed features of this aspect of the present invention, the discovery method requires scanning the computer system based on a scan profile to detect the one or more mobile devices. The scan profile defines discovery rules such as network, domain, IP address, netmask, and computer identity to be scanned (or not to be scanned). The gathered information can be grouped in a variety of formats, such as based on mobile devices types. The information gathered as a result can be analyzed, stored, reported or displayed.

DETAILED DESCRIPTION OF TIE INVENTION

Overview of the Present Invention

The system and method for securing data in mobile devices of the present invention includes a computing node and a plurality of mobile devices, as later defined below. A node security program or agent executed in the computing node interfaces with a device security program executed at a mobile device, if one exists or interface with device resources. The node security program or agent can also interface with a node security program executed at another computing node. The computing node or alternatively a security server can be responsible for sending information and created profiles to other devices, nodes, or agents, and for controlling the flow of information and data with devices, nodes or agents.

The node security program interprets a node security profile to control data synchronization, data transfer, data query, data collection, file and program access and execution or device discovery (as further described below) in connection with one or more mobile devices or other external resource discovery, for example external storage discovery like USB flash cards and memory. For example, the node security program can prevent synchronization of data between the mobile device and the computing node if not authorized in accordance with the node security profile information. Also, the node security program can prevent the mobile device from collecting data, run programs and access files from a connected network. The node security program can also prevent any resource on the network or computing node to access resources, files, execute program, collect and query data on the mobile device, if not authorized in accordance with the security profile information.

The information contained in the node security profile can be used to determine whether a client station acting as a computing node is authorized to transfer a device security profile that sets the security parameters for a mobile device. If authorized, the device security profile is transferred or otherwise copied from the computing node to the mobile device. A device security program, which is executed in the mobile device, interprets the device security profile, for example, as an .ini or XML file, to set the transferred security parameters for the mobile device. If not authorized, the node security program can lock the unauthorized mobile device, for example, by transmitting a device security application to be executed at the unauthorized mobile device, among other things. The device security profile can lock the device for usage, disable IR beam, Bluetooth, networking, sound and voice information.

The node and device security profiles can define the security parameters in accordance with a defined security policy. As such, the device and/or node security profiles can be created at a central station, such as a server station, using a policy editor program. The security policy can also be created, maintained and enforced at the computing nodes or mobile devices. The created device and node security profiles can be transferred to the computing node or the mobile devices over a network using a push technology, for example. Alternatively, upon request, a pull technology may be used, for example in a wired/wireless network, to transfer the node and device security profiles to wired/wireless mobile devices and computing nodes. Under any one of these arrangements, the computing node security profile and the device security profile can be updated periodically by checking one or more designated web sites or accessing a central station or server station, for example LDAP/Active, database, file directory repository. In a similar manner, the device security profile can be updated by accessing the computing node or accessing a central station or server station. Also, more than one security profiles can be created, transferred and stored on the mobile device.

Another aspect of the present invention is a discovery system and method for managing a computer network which involves scanning the network based on a scan profile to locate one or more mobile devices or device types belonging to the network. For example, the scan profile can contain information regarding at least one of network, domain and computer identity to be scanned. In the discovery process of the invention, a node, computing node, IP address, or domain can be either included or excluded from being scanned. As such, the scan profile can contain information regarding at least one of network, domain and computer identity not to be scanned. The type of the located mobile device is determined based on entries in an application registry, synchronization log, directory structure, a database or other protocols for example SNMP. The mobile device type information gathered through the discovery process can be used for managing security in the computer network. The located mobile devices can be grouped by type, domain, IP address for reporting and display purposes, identifying welcomed and un-welcomed mobile device as well as risk and vulnerability status.

Security Management System

Referring to FIG. 1, an exemplary system 100 that advantageously implements the present invention in a network is shown. The system of the invention supports security amongst computing nodes 102 and mobile devices 104, which are also referred to as user-devices. The computing nodes 102 can be any type of wired or wireless network node, a client station connected to a security application server 106 directly or via a network 122. The computing node 102 can also be a stand alone computer. The mobile devices 104 can be of any type. Under one feature of the present invention, various types of mobile devices operating within the system 100 can be discovered, located or detected for managing security. For example, the present invention can support any handheld device, personal digital assistant, phone, smart phone, pager, etc.

Under the present invention various types of data, files and profiles can be transferred between the computing nodes 102 and mobile devices 104 over any supported transport layer, link, or physical connection. The transport protocol can be any suitable protocol, including TCP/IP, various telephony transport protocols, etc. The links can be wired or wireless links 110, 112. The wired links 110 can be twisted pair, coaxial cable, optical cable, etc. As described later in more detail, the wireless links 112 can support any number of over-the-air protocols.

In an exemplary embodiment, the system 100 of the invention is implemented over a network that includes server stations 114, client stations 116, and a host or central station 118 either directly or via any collection of interconnected (public and/or private) networks that are linked together by a set of standard or proprietary protocols. The system of the present invention can also support various wireless links with defined protocols. Examples of such protocols include any one of IEEE 802X, GSM, IS-136, IS-95, Bluetooth, etc.

The present invention may also be implemented over the Internet, a distributed network that supports the World Wide Web ("Web"). The Web refers generally to both (i) a distributed collection of inter-linked, user-viewable hypertext documents that are accessible via the Internet, and (ii) the user and server software components which provide user access to such documents using standardized Internet protocols. A Web Site is a computer system that serves informational content over a network using the standard protocols of the World Wide Web. Typically, a Web site corresponds to a particular Internet domain name and includes the content associated with a particular organization.

As shown in FIG. 1, the security application server 106 can access a security database 120, which stores various data, including security profiles for the computing nodes 102 and mobile devices 104. The database 120 can also store collected and discovered information from computing nodes 102 and mobile devices 104, including event log and audit log information, etc. The security application server 106 communicates with such devices through a network layer interface 122. The network used in connection with the present invention can use any one of open- or proprietary-network standards. In a preferred embodiment, the system interconnections are based on an open system interconnection (OSI) model as proposed by the International Standards Organization (ISO).

It should be noted that the present invention need not be implemented over a network. In fact, the present invention can use a computing node alone or as a part of a network as long as it possesses the processing power to execute programs and applications in accordance with the present invention.

When the computing node is not connected to any network the mobile device access between the computing node 102 and the mobile device 104 is an off-line access.

Managing Security Between Computing Node and Mobile Devices

Figure 2:
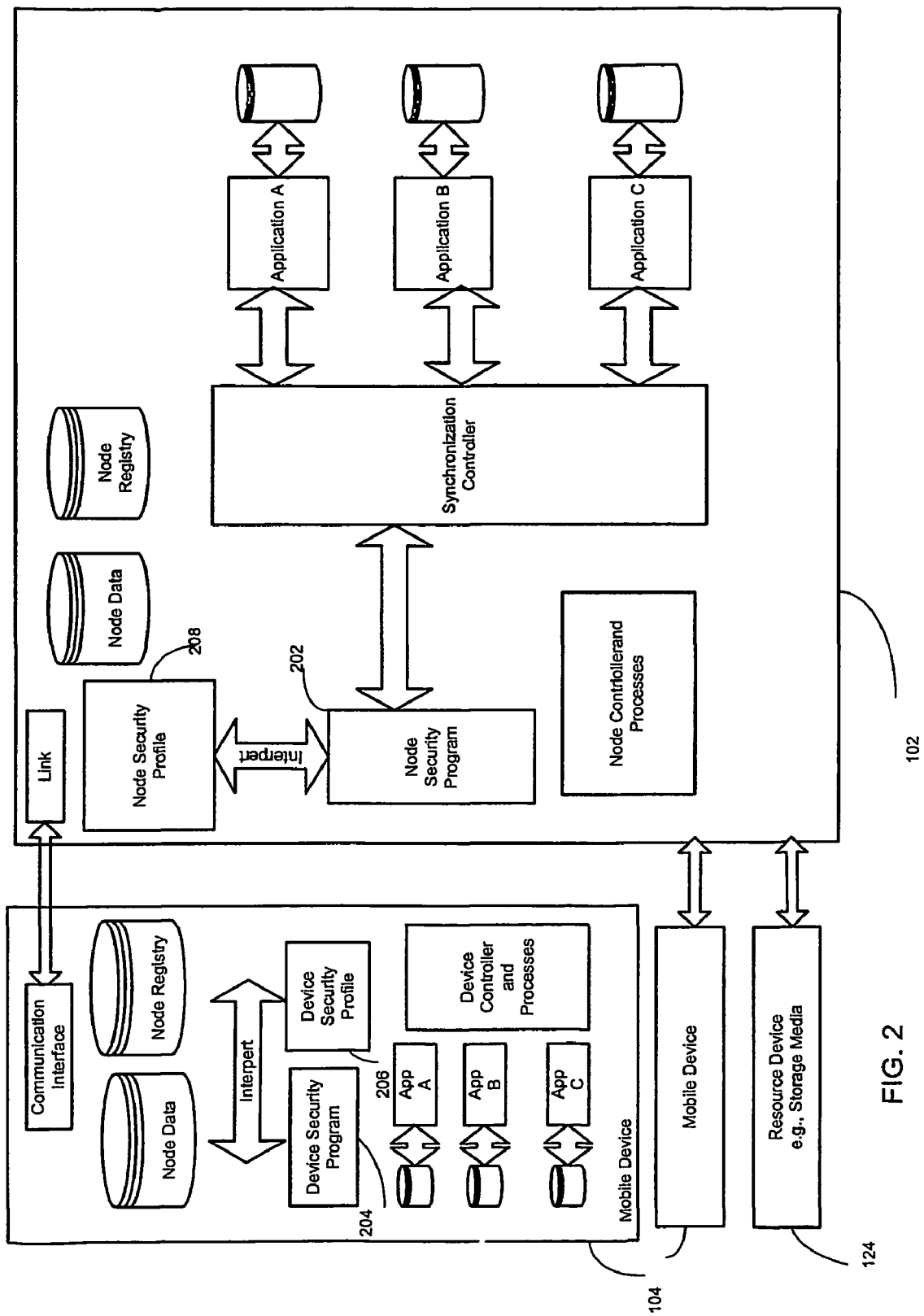
FIG. 2 is a block diagram of a computing node and devices that operate within the system shown in FIG. 1.

Referring to FIG. 2, a block diagram for managing security between the computing node 102, mobile devices 104 and the resource device 124 is shown. A node security program or agent 202 is executed in the computing node 102 for interfacing with a corresponding device security program or agent 204 executed at the mobile device 104 or resource device 124. The mobile device security is dictated by a device security profile 206 that is interpreted by the device security program 204. The node security program 202 interprets a node security profile 208 to determine one or more security parameters for managing the security between the computing node 102, resource device 124 and mobile devices 104, including controlling transfer of data, files, device profiles, applications and programs between the computing node 102, resource device 124 and the mobile devices 104. For example, the security parameters derived from interpreting the node security profile 208 may require preventing data synchronization between one or both of the mobile device 104 and resource device 124. The computing node 102 acts as a single point communication gateway between the mobile devices 104 and other network resources 124. One such resource can be a storage device, e.g., a USB enabled flash or SD card. Such resources can include a synchronization program. The node security profile 208 can enable the computing node security program 202 to monitor, scan, query, accept, deny, password protect a request to create, maintain, terminate, modify, a communication link or activity. Based on security parameters determined by interpreting the node security profile 208, the node security program 202 can prevent remote execution, utilization of any application or file on the mobile device 104 or resources 124. Based on the determined security parameters, the computing node security program 202 can enable or disable synchronizing particular kind of data. For example, the interpreted security parameters can specify that address book data cannot be synchronized.

As such, the security parameter can relates to authorizing synchronization with the computing node 102 or other types of transfer of data, files and programs applications between the computing node 102 and devices 104 and 124. The information contained in the node security profile 208 can include information that alone or in combination identify an authorized or unauthorized computing node, an authorized or unauthorized user, an authorized or unauthorized mobile device, an authorized or unauthorized central station, or an authorized or unauthorized network or resource, such as an external storage devices. The identity may be specified by physical address, serial number, model number, device type, server or a network resource ID, software license number (registration number), user ID etc. The authorized or unauthorized computing node can be specified relative to mobile device parameters, such as device type, etc. For example, certain computing nodes 102 may be authorized to synchronize data with certain specified mobile device types, but not authorized to synchronize data with other device types and vice versa.

Computing Node Security

The computing node 102 manages all aspect of data, file, application, and device profile transfer acting as a gateway for all types of device security management. Among other things, the computing node 102 is responsible for control of mobile device data in to and out of the computing node based on security parameters contained in the node security profile 208.

As stated above, the computing node 102 can be any type of wired or wireless network node, including a client station connected to the security server 106 directly or via a wired or wireless network. In its simplest form, the computing node 102 can be a stand alone computer station. Also, the computing node 102 can itself be a mobile device 102 that is responsible for managing security for other mobile devices 104. As stated above, the security parameters of the computing node 102 is defined by the node security profile 208. For example, the node security profile 208 can set user access rights by enabling/disabling or password protecting users' ability to configure the computing node 104 and/or its profile. Depending upon the security parameters set in the node security profile 208, corresponding changes are made to the registry key, file, or database entries of the computing node 102 or its configuration file to enforce the node security profile parameters. Registry key, file, or database entries along with functionality associated with the computing node 102 are used to control and monitor all data synchronization, transfer, access, modification, or execution of files, applications, programs, profiles (e.g., security profiles) and processes that occur through the computing node by any data transport that relates to applications that synchronize data with the devices 104 and 124. The computing node security program 202 can also check, for example, periodically, for security profile updates.

Under another arrangement, the computing node security program 202 can be deployed for a given IP range, network domain or user list automatically. For example, the security server 106 can detect and identify the computing nodes 102 that do not have or execute corresponding node security programs 202 within an IP range, network domain or user list. Once such determination is made, the server 106 can automatically transmit the node security programs 208 to the so detected IP range, network domain or user list.

The computing node profile can also have a validation life span that could indicate a time frame that the profile can be used or applied. This life span can be indefinite meaning that it can be used at any time or can have a range of date and time.

Device Security

In contrast with the node security profile 208, which sets the computing node security parameters, the device security profile 206 sets the security parameters for the devices 104 and 124, as interpreted by the device security programs 204. The device security parameters include encryption preferences, global (device) password, local (application or resource) password, access control to applications and resources, access control to the device, integrity protection against hackers and traps, file encryption options, port protection, communication protection (i.e., send and receive), ability to use wireless connections like Wi-Fi, 802.11, Bluetooth, controlling the content of the device like restricting installing of some applications, etc.

In one embodiment of the invention, the information contained in the node security profile 208 can be used to determine whether the computing node 102 is authorized to transfer a device security profile 206 to a mobile device 104. For example, upon a request initiated by the mobile device 104 when it connects it to the computing nodes 102. If the computing node 102 is an authorized computing node, as further described below, upon request, the device security profile 206 is copied from the computing node 102 to the mobile device 104 using an established wired or wireless link. Alternatively, upon connection or detection of connection to a security policy repository, server or computing node, the mobile device can request creation of a device security profile in real-time bases or query to determine whether a device security profile has been created for it at any time in past to be utilized when requested.

The device security program 204 executed in the mobile device 104 interprets the transferred device security profile 206, as an .ini or XML file for example, to set the transferred security parameters for the mobile device 104. If the computing node 102 is not authorized, the node security program 202 can lock the mobile device, for example, by transmitting a device security application to be executed at the unauthorized mobile device, wipe or erase data on the device, or require system administrator intervention, among other things. Both the device and node security profiles can be any type of file that can be interpreted by corresponding device and node security programs, for example a text or .ini file or a binary file or XML file.

According to another feature of the present invention the device security is also controlled temporarily in terms of time, for example, based on year, month, day, hour minute. The device security can also be based on location as determined by any one of well known positioning or location determination techniques. Under this arrangement, device security profiles 206 can be created dynamically based on time and/or location of the device The created profiles can be transferred to the devices 104 or 124 using any one of over-the-air protocols, for example. The security profiles (node or device) can be pre-loaded and activated as needed. Under another arrangement, the device security program 204 can be deployed for a given IP range, network domain or user list, or synchronization ID automatically. For example, the security server 106 or computing node 102 can detect and identify mobile devices 104 that do not have or execute corresponding device security programs 206 within the IP range, network domain or user list. Once such determination is made, the node security program 202 can automatically transmit the device security programs 204 to the so detected IP range, network domain, user list, or synchronization ID.

Under another arrangement, the computing node profile has a validation life span that could indicate a time flame that the profile can be used or applied. This life span can be indefinite meaning that it can be used at any time or can have a range of date and time.

Under another arrangement, multiple device profile can be loaded, stored and transferred to the mobile device, resources. Only one profile can be loaded and active at a time. The appropriate profile can become active based on time, day, date, location or device sensing equipment. For example, as soon as the mobile device is moved to a secure location an external device sends appropriate signals to the mobile device to active a different device profile.

Creating Security Profiles

A node or device security profile 206 or 208 defines one or more security features used for providing various security quality features and characteristics within the computer system 100 of the present invention. The security profiles 206, 208 can be created at the central station 118, the server station 106 or at a computing node 102. As stated above, the node security profile 208 defines the parameters for managing security in accordance with the present invention. The node security profile 208 is interpreted by the node security program 202 to determine the security parameters. The present invention can use any suitable tool for creating security profiles that have defined interpretation rules, such those that govern .ini or XML files. The security profiles can be edited using corresponding editing tools. If the security profile is a text profile, for example, a text editor can be used for creating the node profile. The security profile can also be a binary or XML file interpreted by the node security program or agent based on defined rules.

Figure 4:
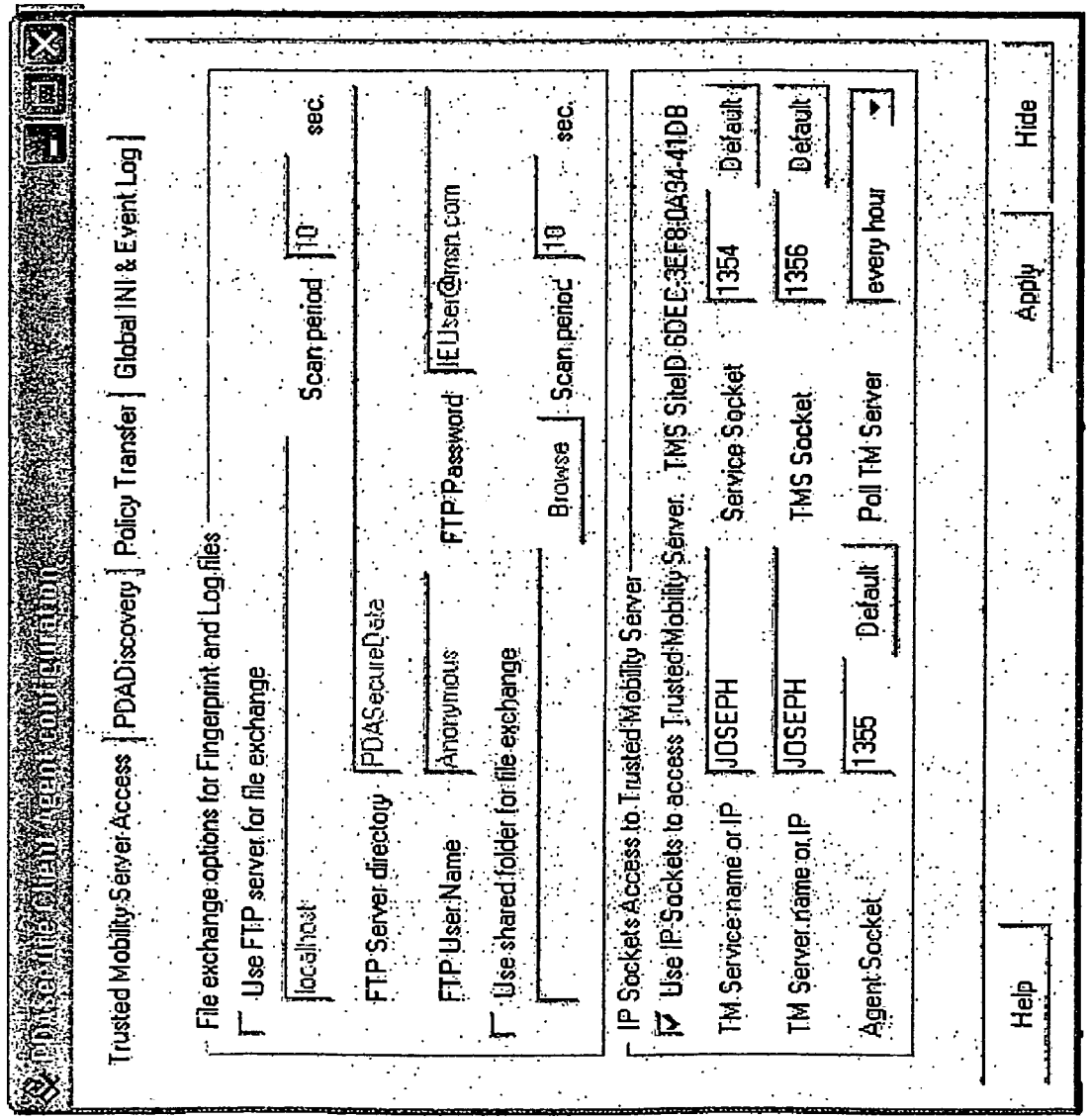
FIG. 4 is an exemplary diagram of an interface for setting security parameters for a computing node.
Figure 6:
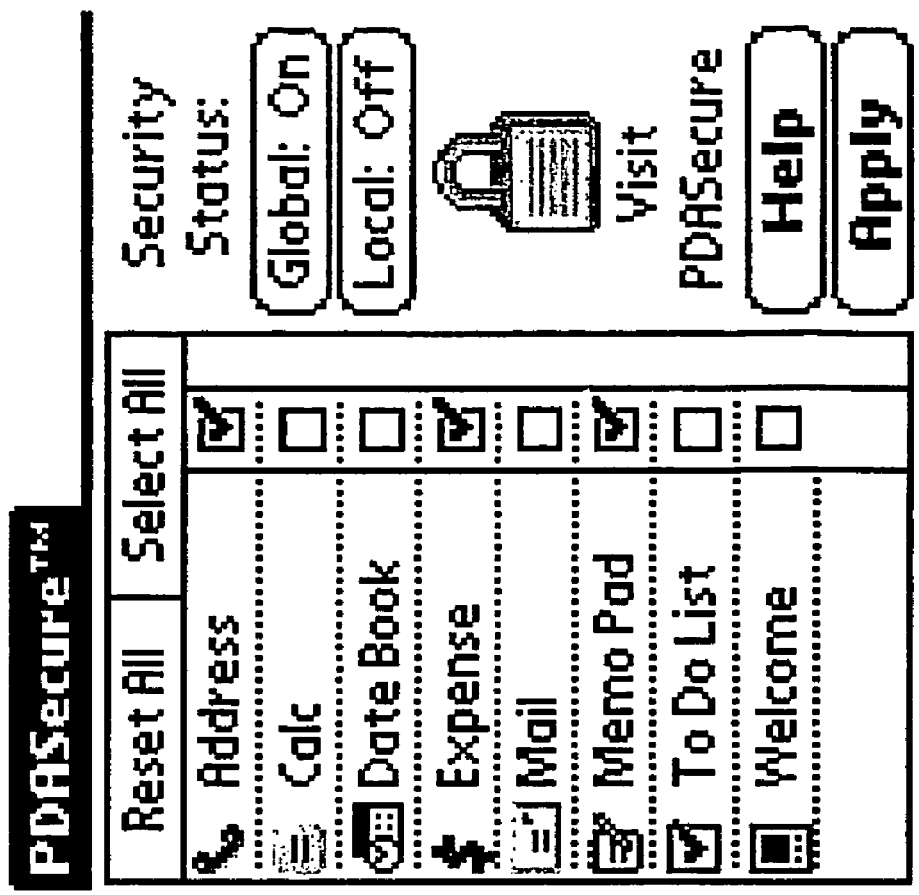
FIG. 6 is a diagram of an interface for setting security parameters in a mobile device.
Figure 5:
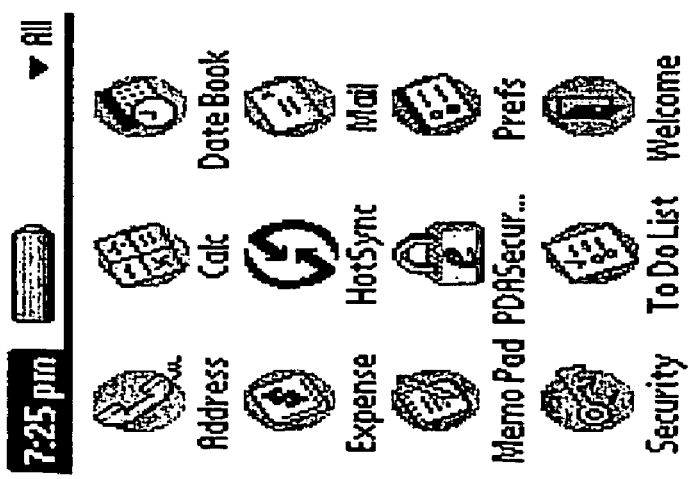
FIG. 5 is a diagram for interfacing with applications in a mobile device.

FIG. 3 shows an exemplary security profile. FIG. 4 illustrates an exemplary interface for setting security parameters for a computing node in accordance with the invention. For example, the server access tab shows security parameters for communicating with a server. Other shown tabs can be used to set device discovery, security policy transfer and event log parameters. FIG. 5 illustrates an interface on a mobile device for activating various applications. FIG. 6 illustrates an interface for a device security profile that applies security parameters to an "Address" and "Expense" application.

The security of system 100 can be managed based on a centrally promulgated security policy. Such security policy can be defined for a network or a public or private institution, such as corporations, schools, governmental agencies, etc. In one embodiment, the security profile can be created by running an editor program 702 (shown in FIG. 7), which is designed to create security profiles based on a defined security policy. The created node security profiles 208 can be transferred to one or more computing nodes 104 over a network, for example, using a push or pull technology. The transfer of the security profiles can be relative to an IP range, a subnet mask or a network domain name. A pull technology may be used, for example, in a wireless network, to transfer node and device security profiles to wireless mobile devices and computing nodes upon request. Under any one of these arrangements, the computing node security profile 208 and the device security profile 206 can be updated periodically by checking one or more designated web/ftp sites or accessing a central station or server station. In a similar manner, the device security profile 206 can be updated by accessing the computing node 102. The device security program 204 can also automatically request device security profile 206 in real time.

Synchronization

Figure 7:
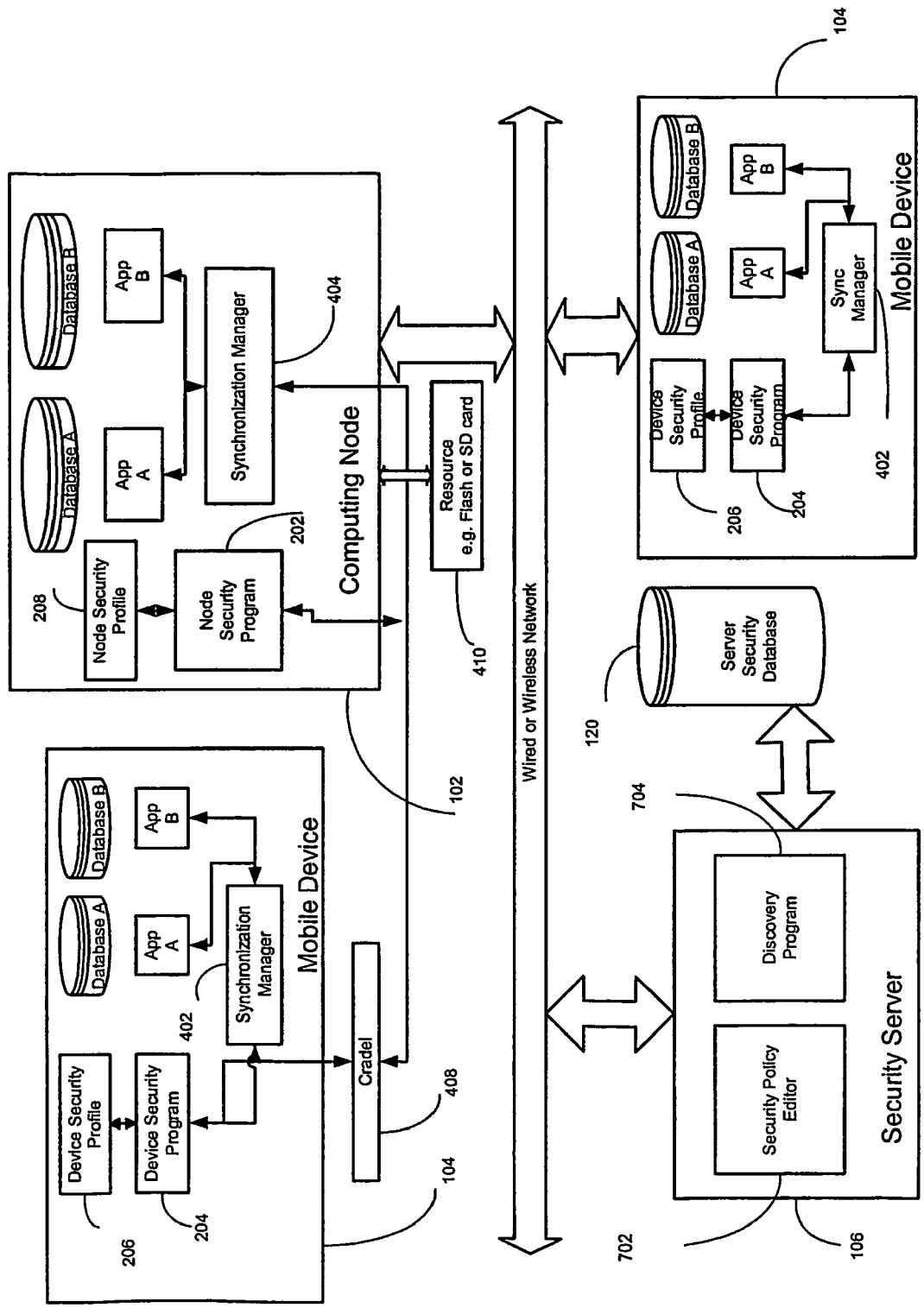
FIG. 7 is a block diagram of a an exemplary security system in accordance with the present invention.

FIG. 7 illustrates a logical block diagram for the security system and method of the present invention. In one exemplary embodiment, the system and method of the invention provide security for mobile devices 104 a resource device 124 that share information with computing nodes 102 that store data for corresponding applications running on each device. For example, a mobile device can execute two applications: a calendar application A and a contact application B for calendar and contact management. Calendar and contact information for each application running in the mobile device is stored in calendar databases A and contact database B, respectively. Similarly, the computing node 102 can execute corresponding calendar applications A and contact application B, where calendar and contact information are stored in corresponding databases A and B in the computing device. In order to share data related to these applications, the databases A and B of the mobile device are synchronized with the databases A and B of the computing node. A synchronization program 402 on the mobile device 104 and a peer synchronization program 404 on the computing node 102 perform the necessary operations to synchronize information stored in the databases. A synchronization system for mobile devices is described in U.S. Pat. No. 5,727,202 entitled "Method and Apparatus for Synchronizing Multiple Files On Two Different Computer Systems."

Synchronization Security

The present invention provides security under various environments including: 1) securing one/multiple mobile devices that synchronize with a single computing node, for example, through a cradle, 2) securing a single mobile device that synchronizes with multiple local computing nodes, for example, multiple client stations, 3) securing a mobile device that synchronizes with a remote computing node, such as a server, across a network using a local computing node, such as a client station, and 4) securing a mobile device synchronizing with a remote computing node through a wired or wireless network. The present invention handles each different environment appropriately with minimal user interaction.

In its simplest form, the system of the invention comprises a mobile device 104 coupled to a computing node 102, which is a stand alone computer station. The coupling is through a connection of the computer station and a mobile device cradle 408 that is used for data synchronization between the mobile device 104 and the computing node 102. A user drops the mobile device 104 into the cradle 408 and activates a button to initiate synchronization. The button activation causes a synchronization program on the mobile device to be executed in accordance with security parameters defined b the node security profile 208. For example, the node security profile 206 can define the ability to block, not to block, to prevent, to allow, to password protect, to enable, or to disable the synchronization operation, data transfer, operations to be performed as well as applications and data to be used during synchronization.

As shown in FIG. 7, other computers such as server and client stations can also be coupled to the network The mobile devices 104 can synchronize either with a local computing node 102 or a remote computing node across the network. Once the security of provisions are verified, the synchronization program on the mobile device works with a peer synchronization program on the computing node.

Authorized Synchronization Station

According to this feature of the invention, computing nodes 102 can be designated as authorized or unauthorized synchronization stations within an environment. A system administrator can designate specific computing nodes as authorized for one or more users or group of users, but unauthorized for other users or group of users. For example, the administrator can restrict certain users from synchronizing on stations located in a defined room or area. Similarly, the administrator can allow specific computing nodes 102 to be used as authorized synchronization stations. This allows for better implementation of security and to insure unauthorized access to data by synchronizing on different unauthorized systems does not take place.

The node security profile 208 defines the parameters for synchronization actions that can or can not be performed on the computing node. The list of authorized computing nodes can be displayed on nodes or servers. A computing node can be enabled/disabled as a synchronization station as required based on administration request or real-time request from other resources. The device security profile 206 stored on the mobile devices 104 can also include parameters for managing synchronization between the mobile device and the computing node.

Mobile Device Discovery

According to another aspect of the invention, a discovery process is used to discover, detect, or locate mobile devices 104, resources based on specified discovery rules. Various methods can be used to detect and discover the mobile devices 104 or resource devices 124. The discovery of the mobile devices can be done remotely or locally. Remote discovery can be within a network that comprises domains, with each domain including a number of computing nodes. Under this arrangement, the discovery, detection and location of the mobile devices, resources can be controlled by a central discovery program 704 or agent, for example, one that runs at the security server 106. Also, the discovery method of the present invention can be a local discovery process, where the mobile devices 102 are discovered or detected locally at a computing node by running a discovery agent in the computing node locally as opposed to a centrally. The discovery process can detect and track, how a mobile device or external resource is used and on which systems a particular resource or mobile device has synchronized data. The discovery can also detect foreign and unknown devices (that have not been attached to the network earlier) entering a wired or wireless network of an organization.

Figure 8:
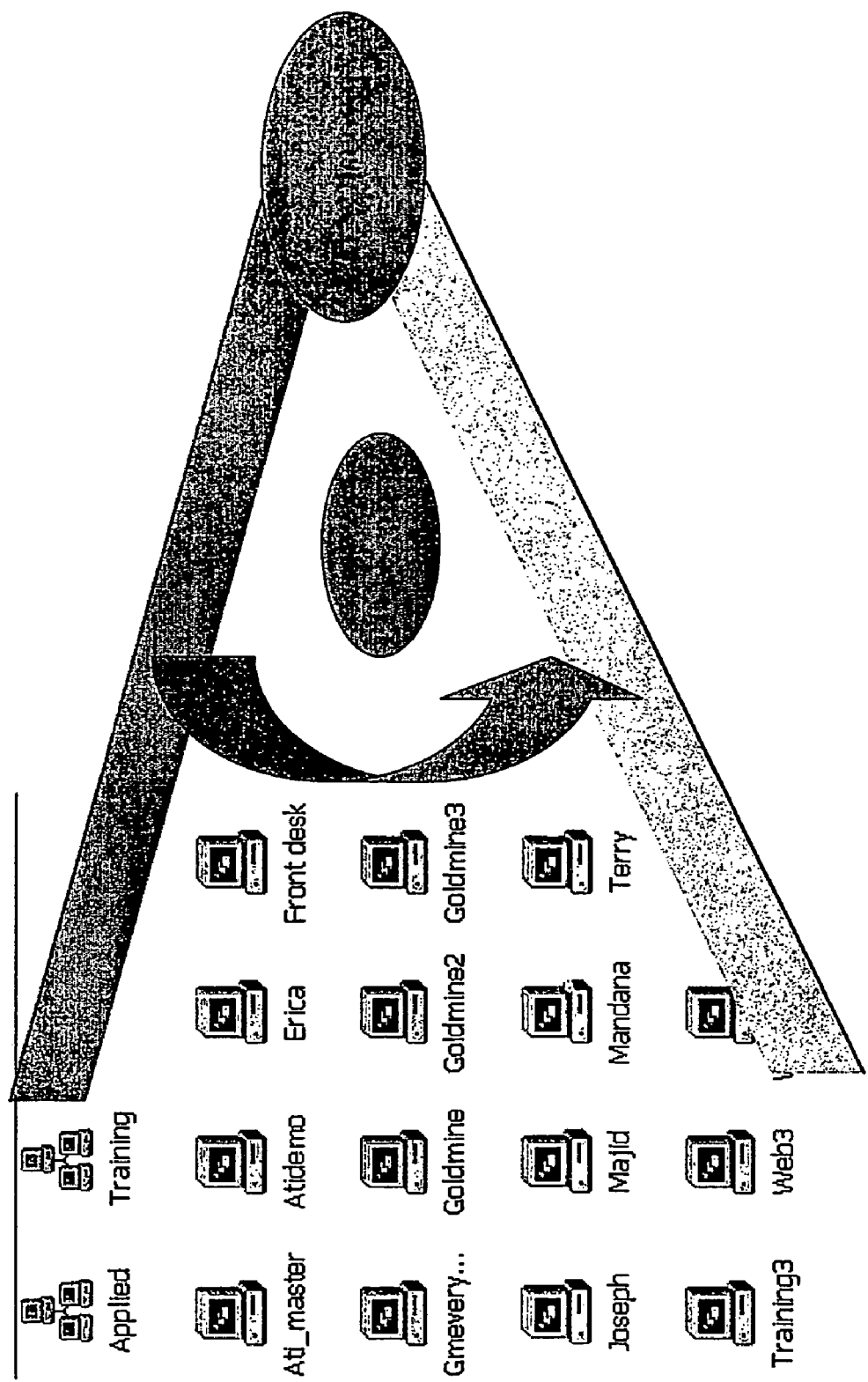
FIG. 8 is a diagram for applying a discovery method in accordance with one aspect of the present invention to a network.

FIG. 8 illustrates a diagram for a system that uses the discovery method of the present invention. According to one embodiment, a system and method for managing a computer network involves scanning the network based on a scan profile that comprises defined discovery rules. Based on the discovery rules, this aspect of the invention discovers, detects, or locates one or more mobile devices or other resources that at one time or another have attached to the system. One such resource can be a storage device (fixed or removable) that contains sensitive information. For example, USB flash, memory or SD card storage media (or any other resource) that can attached to the computing node 102 or the mobile devices 104 using well known protocols. Thus, the discovery method of the present invention can discover and secure the storage media or any other resource that attach to the computing node or mobile devices.

The scan profile can contain information regarding at least one of network, domain and computing node identity to be scanned. Alternatively, the scan profile can contain information regarding at least one of network, domain and computing node identity not to be scanned. The discovery program scans the domains or computing nodes based on the scan profile to discover, detect or locate the mobile devices, e.g., based on a domain identity. Thus, the scan profile defines the parameters for connecting to domains, computing nodes and mobile devices.

In a remote discovery process, the discovery program running on the central station 118 on server 106 detects the domains of the network. After detecting the domains, local and/or remote the computing nodes 102 within the domain are detected by attempts to establish corresponding connections to the computing nodes. Depending on the computing node, the connections can be authenticated or unauthenticated. If an attempt to establish an unauthenticated connection is not successful, an attempt is made to establish authenticated connection. The connection with each computing node can be authenticated using known authentication features, such as a set of password, for example, the last used password to access the computing node. If authentication using the last used password is not successful, pre-defined or selected passwords can be used to access the resources. If no valid password is available, the administrator may be asked to perform password authentication. Once the authenticated or un-authenticated connection is made, the computing node is accessed to detect mobile devices or resources.

Information regarding discovered, detected, or located mobile device or resources is determined based on any one of a registry resource, a file resource, a process resource, a network management parameter, a communication protocol parameter, a data format, a packet format, a synchronization log entry, a directory structure or a database entry. For example, the application registries on the computing node 102 can be interrogated to determine what type of devices have attached to the node. More specifically, registry resources are processed to detect device type in terms of whether the detected mobile devices is a Palm, Nokia, Research In Motion (RIM), or Windows CE device. The mobile devices or external resources can leave an imprint in the registry structure any time they attach to a computing node. The imprint is not erased when a device disconnects. Thus, any device that has attached to the computing node at any time in the past can be detected and identified. Alternatively, the devices can be identified based on connecting to local and remote processes, objects and process requests or connecting to remote drives, file objects, etc.

Figure 9:
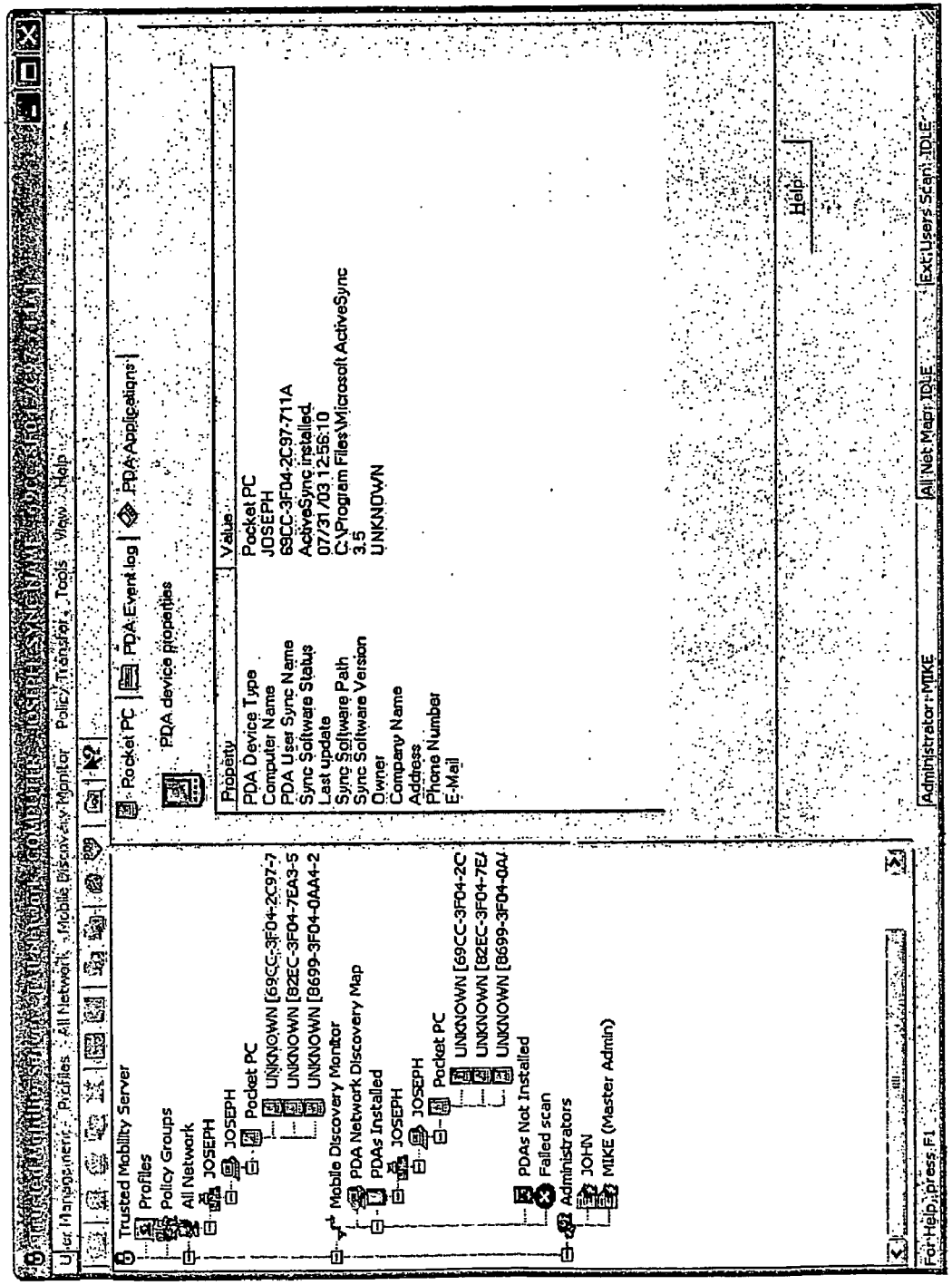
FIG. 9 is a diagram of an interface for information discovered in the discovery method of the invention.

FIG. 9 illustrates an interface that shows the discovered mobile devices. As shown, the computing node "JOSEPH" has a pocket PC attachment directory with a number of unknown mobile devices that at one time or another have attached to the computing node. As shown, information determined by the discovery process of the present invention include device type, device identity, synchronization software type, synchronization software availability, synchronization software location, synchronization software version number.

Also determined are information regarding previous synchronization information such as data and time stamp of last synchronization, the type of device used during previous synchronization, synchronization D). Moreover, information regarding device owner can also be determined by the discovery process of the present invention including e.g., name, address, company, etc. Still other determined information include type applications and files installed or used on the mobile device with file size file name, file attribute, and manufacturer information, time stamp of all completed and incomplete synchronization and data access and connections performed or made as well as the type of data and information transferred to and from mobile device and other resources relative to the computing node.

Figure 10:
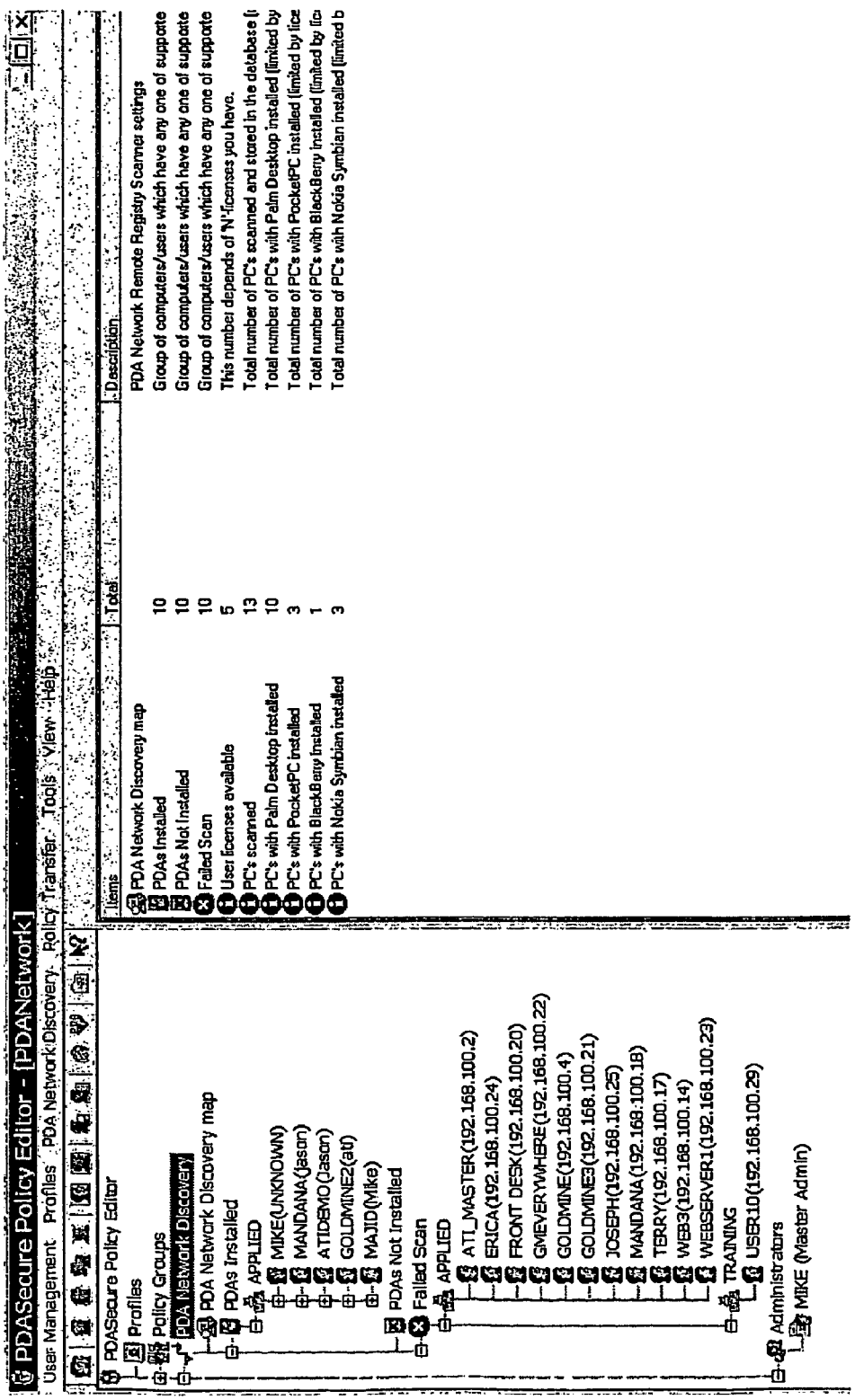
FIG. 10 is a diagram of a reporting interface based on information gathered by the discovery method of the invention.

Also, network management parameters, such as those defined by the Simple Network Management Protocol (SNMP) can be used to locate, detect and discover the types of the mobile devices or resources that have attached to the computing node. Also, the data and packet format as well as associated transport and network protocol parameters, e.g., TCP, UDP, and IP can be used to locate, detect or discover the type of mobile devices. Such mobile device type information is used for managing security in the computer network. By processing any of the gathered information, the discovery system and method of the present invention provides an, effective management tool for managing all security aspects of any computer system An exemplary report derived from gathered information by the discovery method of the invention is shown in FIG. 10.

Under another arrangement, mobile devices or resources are discovered by a discovery program or agent that runs on the server, only when the mobile devices connect to the computing node or using registry, file, process resources, as explained above. Under yet another arrangement, the discovery program runs as an agent in the computing node. The discovery agent in the computing node thus can discover and control unwelcomed devices and resources, based on a node security profile, which defines synchronization and data transfer rules. The detected discovery data can be stored in secure files and transferred to the security server for processing.

The discovery rules for detecting or locating the mobile devices or resources can be either hard-coded in the software or defined as a discovery or scan profile. Such profiles can be updated on-demand, manually or automatically as required to get an updated discovery or scan profile.

Software Development Kit (SDK)

An SDK provides programming interface to allow the software developers the ability to integrate the present invention with the other platform provided with the system.

The security system of the present invention can be implemented using defined application programming interfaces (APIs). APIs are contained in a library as a set of software functions that perform various security tasks. Also defined are the structures and parameters needed to correctly call these public functions.

The SDK would help any third party developer to develop security solutions. It eliminates the need to write the encryption libraries from scratch The input and output parameters of these API calls are clearly defined so that they can be easily embedded in any existing source code. The SDK also helps in providing customized solutions to unique problems encountered by the customers.

| CryptoFileAccess | class members |
|---|---|
| | Construction |
| CryptoFileAccess bdehart@MWE.com | Construct CryptoFileAccess object. |
| Open | Creates or opens a file object. |
| Close | Closes a file and deletes the object |
| | Input/output |
| Read | Reads (unbuffered) data from a file at the current file position. |
| Write | Writes (unbuffered) data in a file to the current file position. |
| | Position |
| SetPointer | Positions the current file pointer. |
| GetPointer | Set position of file pointer. |
| SetSize | Set the length of the file. |
| GetSize | Get length of the file |
| | Status |
| IsOpen | Get file open state. |
| IsFileEncrypted | Return status of file (true if encrypted) |
| | Operations |
| EncryptFile | Encrypts specified file. |
| DecryptFile | Decrypts specified file. |
| | Operator |
| HANDLE | Get handle to opened file |

-continued

| No. | Function names |
|---|---|
| 1 | CryptoFileAccess::CryptoFileAccess( ) |
| 2 | CryptoFileAccess:: CryptoFileAccess(PCSTR pszPassword, CRYPTALGS alg,PCTSTR pszFileName, DWORD dwDesiredAccess, DWORD dwCreationDisposition, DWORD dwFlagsAndAttributes = FILE__ATTRIBUTE__NORMAL, SECURITY__ATTRIBUTES* pSecurityAttributes=0, HANDLE hTemplateFile=0); |
| 3 | Void CryptoFileAccess::Open(PCSTR pszPassword, CRYPTALGS alg, PCTSTR pszFileName, DWORD dwDesiredAccess, DWORDdwCreationDisposition, DWORD dwFlagsAndAttributes=FILE__ATTRIBUTE__NORMAL, SECURITY__ATTRIBUTES *pSecurityAttributes=0,HANDLEhTemplateFile=0); |
| 4 | Void CryptoFileAccess::Close( ) |
| 5 | Bool CryptoFileAccess::Write(const void* p, DWORD dwSize, OVERLAPPED * pOverlapped=0) |
| 6 | Bool CryptoFileAccess::Read(void* p, DWORD dwSize, OVERLAPPED* pOverlapped=0) |
| 7 | DWORD CryptoFileAccess::SetPointer(long l DistanceToMove, DWORD dwMoveMethod) |
| 8 | DWORD CryptoFileAccess::GetPointer( ) |
| 9 | Bool CryptoFileAccess::SetSize(DWORD dwNewSize) |
| 10 | bool CryptoFileAccess::IsOpen( ) |
| 11 | static bool CryptoFikleAccess::IsFileEncrypted(PCSTR pszFileName) |
| 12 | static bool CryptoFileAccess::EncryptFile(PCSTR pszPassword, CRYPTALGS alg, PCTSTR pszSourceFil e, PCTSTR pszDestFile) |
| 13 | static bool CryptoFileAccess::DecryptFile(PCSTR pszPassword, CRYPTALGS alg, PCTSTR pszSourceFil e, PCTSTR pszDestFile) |

I claim:

1. A method for managing a computer system on a network, the computer system including a computing node located on the network side of a network connection on the network and one or more mobile devices located on a user's side of the network connection on the network, comprising:
running a discovery program on the network side of the network connection, the discovery program comprising:
scanning the network based on a scan profile defining at least one parameter for connecting to at least one of domains, computing nodes, and mobile devices;
detecting at least one domain on the network in accordance with the parameters defined in the scan profile,
detecting at least one computing node within the detected domain in accordance with the parameters defined in the scan profile, and
connecting to at least one of the detected computing nodes in accordance with the parameters defined in the scan profile,
detecting, using the discovery program, one or more mobile devices connected to the detected computing node;
detecting, using the discovery program, one or more mobile devices that were previously, but are not currently, connected to the detected computing node;
determining information regarding at least one of the detected mobile devices based on at least one of a registry resource, a file resource, a process resource, a network management parameter, a data format, a packet format, a synchronization log entry, a directory structure, a database entry, the presence of an executable program and attributes associated with a mobile device or resource; and
using the determined mobile device information to manage security of the computer system from the network side of the network connection.

2. The method of claim 1, wherein the discovery program is run in at least one of a remote central station or a local computing node.

3. The method of claim 1 further including grouping the detected mobile devices or resources by type and other attribute.

4. The method of claim 1, wherein the scan profile contains information regarding at least one of network, domain, IP address, netmask, and computer identity to be scanned, time of synchronization and device connection.

5. The method of claim 1, wherein the scan profile contains information regarding at least one of network, domain, IP address, netmask, and computer identity not to be scanned.

6. The method of claim 1, wherein the results of scanning are analyzed and populated and stored and displayed to the users.

7. The method of claim 1, wherein the determined mobile device information includes at least one of device type, device identity, synchronization software type, synchronization software availability, synchronization software location, synchronization software version number, previous synchronization information, data and time of last synchronization, the type of device used during previous synchronization, synchronization ID, device owner information, type of applications and files installed or used on the mobile device, file size, file name, file attribute, manufacturer information, time of all completed and incomplete synchronization and data access and connections performed, type of data and information transferred to and from a mobile device and a resource.

8. The method of claim 1, further comprising at least one of locking and denying access to an unauthorized mobile device attempting to access the computer system.

9. The method of claim 1, further comprising a step of locking an authorized mobile device attempting to access the network.

10. The method of claim 9, wherein the locking step comprises transmitting security software to the mobile device.

11. The method of claim 1, wherein the step of running the discovery program results in detection of at least one of a device type, connection profile, or location of at least one of the mobile devices and resource devices.

* * * * *